United States Patent [19]
Wilkes

[11] Patent Number: 6,032,148
[45] Date of Patent: Feb. 29, 2000

[54] MULTILEVEL STORAGE SYSTEM WITH HYBRID DATA COMPRESSION

[75] Inventor: John Wilkes, Palo Alto, Calif.

[73] Assignee: Hewlett-Packard Company, Palo Alto, Calif.

[21] Appl. No.: 08/929,043

[22] Filed: Sep. 15, 1997

[51] Int. Cl.[7] .................................................. G06F 17/30
[52] U.S. Cl. ........................................ 707/101; 711/117
[58] Field of Search .................................. 707/100, 101; 711/117, 118

[56] References Cited

U.S. PATENT DOCUMENTS

| | | | |
|---|---|---|---|
| 4,758,980 | 7/1988 | Tsunekawa et al. | 707/1 |
| 5,245,337 | 9/1993 | Bugajski et al. | 341/51 |
| 5,684,986 | 11/1997 | Moertl et al. | 707/101 |

FOREIGN PATENT DOCUMENTS

| | | |
|---|---|---|
| 0434158 | 5/1991 | European Pat. Off. . |
| 0720085 A2 | 12/1994 | European Pat. Off. . |

OTHER PUBLICATIONS

Douglis, Fred, "The Compression Cache: Using On–Line Compression to Extend Physical Memory", USENIX Conference, Jan. 1993, pp. 519–529.

*Primary Examiner*—Jack M. Choules
*Attorney, Agent, or Firm*—Ian Hardcastle

[57] ABSTRACT

A multilevel data storage system that comprises an interface, an upper-level storage device, a lower-level storage device and first and second compression state modifying engines. Data are transferred through the interface in a first compression state. Data are stored in the upper-level storage device in a second compression state that is higher than the first compression state. Data are stored in the lower-level storage device in a third compression state that is lower than the second compression state. The first compression state modifying engine is located between the interface and the upper-level storage device. The second compression state modifying engine is located between the upper-level storage device and the lower-level storage device.

18 Claims, 2 Drawing Sheets

MULTILEVEL STORAGE SYSTEM WITH HYBRID DATA COMPRESSION

FIELD OF THE INVENTION

The invention relates to multilevel storage systems, and in particular to multilevel storage systems that transfer data in an uncompressed format, store data in an uncompressed format at low storage levels, and store data in a compressed format at intermediate levels.

BACKGROUND OF THE INVENTION

Information storage systems typically store large quantities of information as cheaply and with as fast an access time as possible. However, data storage devices that provide the most rapid access to stored information are also the most expensive in terms of money per byte stored. Consequently, most information storage systems include a hierarchical multilevel storage system. FIG. 1 shows an exemplary information storage system 1 in which the computer 5 is connected to the multilevel disk store 9. The multilevel disk store is an example of a multilevel storage system. The computer includes the central processing unit (CPU) 3, the random-access memory (RAM) 7 and the I/O interface 11 interconnected by the bus 13. The multilevel disk store is connected to the I/O interface 11 in the computer by the data link 15.

In the information storage system shown in FIG. 1, the computer 5 stores a relatively small fraction of the total amount of the data on which it operates in the fast, expensive RAM 7. The computer stores a majority of the data on which it operates in the multilevel disk store 9, and transfers data back and forth between the multilevel disk store and the RAM as it performs computations and saves the results of such computations. The multilevel disk store accesses data considerably more slowly than the RAM 7, but the cost of storing data in the multilevel disk store is much less than storing data in RAM.

FIG. 2 shows an example of the structure of the multilevel disk store 9 of the above-described information storage system 1. In the multilevel disk store, data are stored by storage devices at two different levels. The disk drives $21_1$, $21_2 \ldots 21_n$ constitute the lower-level storage device 21. Alternatively, a single disk drive may be used as the lower-level storage device. A cache memory constitutes the upper-level storage device 27. The cache memory increases the rate at which data stored in the multilevel disk store 9 can be transferred to the computer 5, and increases the rate at which the multilevel disk store can accept data transferred from the computer. The upper-level storage device is interposed between the I/O interface 29 and the lower-level storage device. The multilevel disk store transfers data to and receives data transferred from the computer 5 via the data link 15. The data link is connected between the I/O interface 29 and the I/O interface 11 in the computer.

The storage level at which a given block of data is stored in multilevel disk store 9 depends on the frequency with which the computer demands access to read the data or to update the data. The more frequently-accessed data blocks are stored in the cache memory constituting the upper-level storage device 27, the less frequently-accessed data blocks are stored in the disk drives $21_1, 21_2 \ldots 21_n$ constituting the lower-level storage device 21. Since the frequency with which the computer 5 demands access to at least some of the data blocks changes with time, the multilevel disk store will change the level at which such data blocks are stored in response to information indicating a frequency of access for the blocks.

Data compression is conventionally used in multilevel storage systems to achieve two purposes, namely, to decrease the data traffic at the lower-level storage device, and to increase the amount of data that can be stored in the system. In conventional multilevel storage systems that use data compression, the blocks of data are compressed at a particular level in the system. Once compressed, the blocks of data are kept in their compressed state at all storage levels below and including the storage level at which they were compressed. Typically, data compression is not applied to the blocks of data stored in the RAM 7 of the computer 5 since the time required to compress and expand the blocks of data would significantly increase the time required to store data in and retrieve such data. However, because the access times between the computer 5 and the multilevel storage system are longer than the computer's internal access times, and because the data transfer rates between the computer and the multilevel storage system are less than the computer's internal data transfer rates, applying data compression to the multilevel storage system does not significantly impair the average time required to transfer data to and from the multilevel storage system.

When data compression is applied to the data stored in the multilevel disk store 9 in the information storage system 1, the compression/expansion engine 31 is interposed between the upper-level storage device 27 and the I/O interface 29. The compression/expansion engine compresses the blocks of data entering the multilevel disk store 9 through the I/O interface 29, and expands the blocks of compressed data read from the upper-level storage device 27 or the lower-level storage device 21 prior to such blocks being transferred to the computer 5. Consequently, the compression applied to the data stored in the multilevel storage system is transparent to the computer and to clients connected to the computer. Blocks of data are stored in the compressed state in the upper-level storage device 27. Moreover, the blocks of data are kept in their compressed state when they are moved to the lower-level storage device 21. Compressing the blocks of data helps achieve the two above-stated goals of minimizing data traffic and maximizing the amount of data that can be stored in the multilevel storage system.

The ability to apply data compression to the data stored in the multilevel storage system without impairing the data transfer rate between the computer 5 and the multilevel storage system is predicated on a wide disparity between the internal data transfer rate of the computer and the data transfer rate between the computer and the multilevel disk store 9. Moreover, using data compression requires the use of complex space management algorithms in the lower-level storage device of the multilevel storage system to cope with the inherent variability in the size of the blocks of compressed data that result from compressing fixed-size blocks of uncompressed data of different data content. Examples of such algorithms are described by F. Dougliss in *The Compression Cache: Using On-Line Compression to Extend Physical Memory*, WINTER 1993 USENIX CONFERENCE, pp. 519–529, (January 1993).

Recent increases in the operational speeds of storage devices such as disk drives suitable for use as the lower-level storage device 21, and recent reductions in the costs of such storage devices make the case for using data compression at all levels below a certain level in a multilevel storage system less compelling. Latency, and not the data transfer rate, is becoming the main limitation on the data transfer performance of modern disk drives. Further limitations are imposed by the complexity of space management systems required to manage variable-sized blocks in systems that are designed to operate with fixed-size blocks.

What is needed is a multilevel data storage system in which data compression is applied more effectively than the data compression arrangements of conventional multilevel storage systems.

SUMMARY OF THE INVENTION

The invention provides a multilevel data storage system that comprises an interface, an upper-level storage device, a lower-level storage device and first and second compression state modifying engines. Data are transferred through the interface in a first compression state. Data are stored in the upper-level storage device in a second compression state that is higher than the first compression state. Data are stored in the lower-level storage device in a third compression state that is lower than the second compression state. The first compression state modifying engine is located between the interface and the upper-level storage device. The second compression state modifying engine is located between the upper-level storage device and the lower-level storage device.

In the data storage system according to the invention, the data stored in the upper-level storage device is in a higher compression state than the data transferred through the interface or the data stored in the lower-level storage device. This way of applying data compression provides the multilevel storage system according to the invention with improved performance and lower cost than a conventional multilevel storage system without data compression, and with simpler space management than a conventional multilevel storage system with data compression.

Normally, the upper-level storage device has a substantially greater per-byte cost than the lower-level storage device. Applying data compression to the data stored in the expensive, upper-level storage device enables the size and cost of the upper-level storage device to be reduced, or allows more data to be stored in an upper-level storage device of a given size. Moreover, the upper-level storage device is typically composed of RAM. RAM does not require special space handling techniques to store the non-constant length blocks of data that result from compressing constant-length blocks of different data content using aggressive data compression algorithms.

The data transferred through the interface and the data stored in the lower-level storage device are typically in an uncompressed state, but may be in a compressed state as a result of being compressed according to a standardized compression scheme, such as JPEG or MPEG.

DETAILED DESCRIPTION OF THE INVENTION

Figure 2:
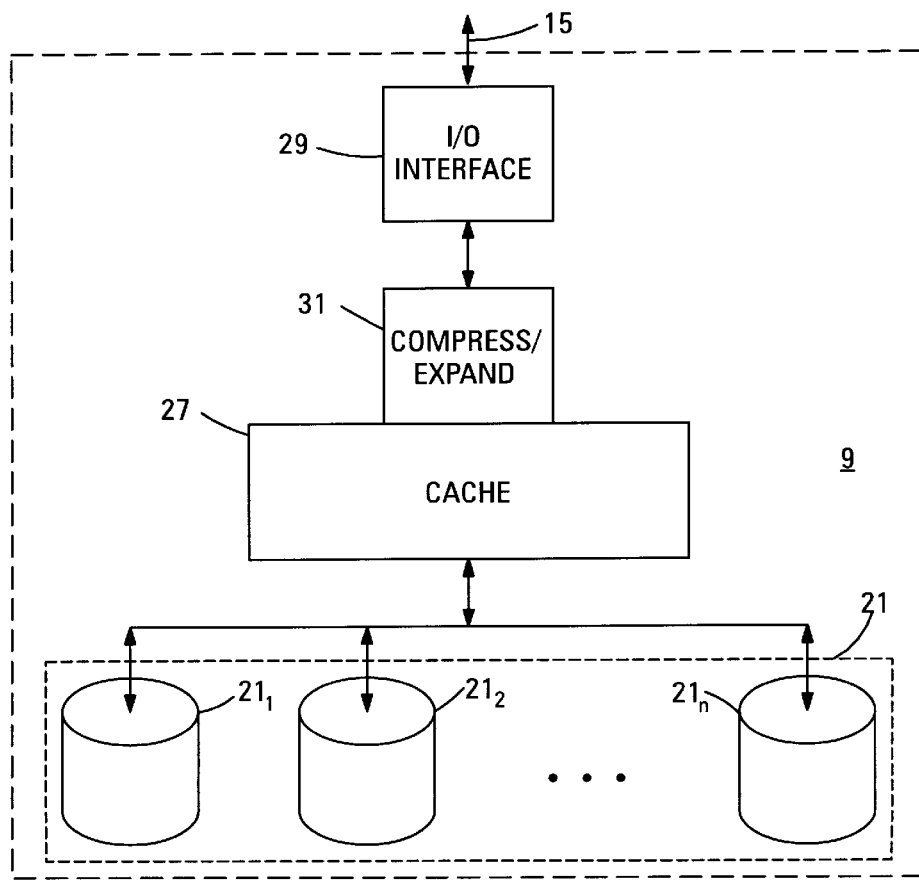
FIG. 2 is a block diagram of a conventional disk-drive based multilevel storage system that incorporates conventional data compression.

The inventor's analysis of conventional multilevel storage systems of the type illustrated in FIG. 2 indicates that the performance and costs of such multilevel storage systems are no longer optimum. This is because:

the speed at which the lower-level storage device transfers data has improved over the last few years so that applying data compression to the data stored in this device provides the multilevel storage system with smaller performance improvements than in the past;

in modern storage devices suitable for use as the low-level storage device, latency, which data compression does not reduce, imposes a considerably greater limitation on performance than the data transfer rate;

when data compression is applied to a multilevel storage system in the conventional way, the complexity of the system is considerably increased by the need to manage variable-sized blocks of data in lower-level storage devices, such as SCSI devices, that are designed to operate with fixed-size blocks; and one of the most expensive elements in a modern multilevel storage system is the cache memory commonly used as the upper-level storage device. This is because the cache memory is typically constructed using dynamic random access memory chips to provide sufficient operating speed.

To provide an adequate hit ratio, the cache memory must be relatively large, as large as several gigabytes in some systems. Large DRAM-based cache memories are expensive.

Figure 3:
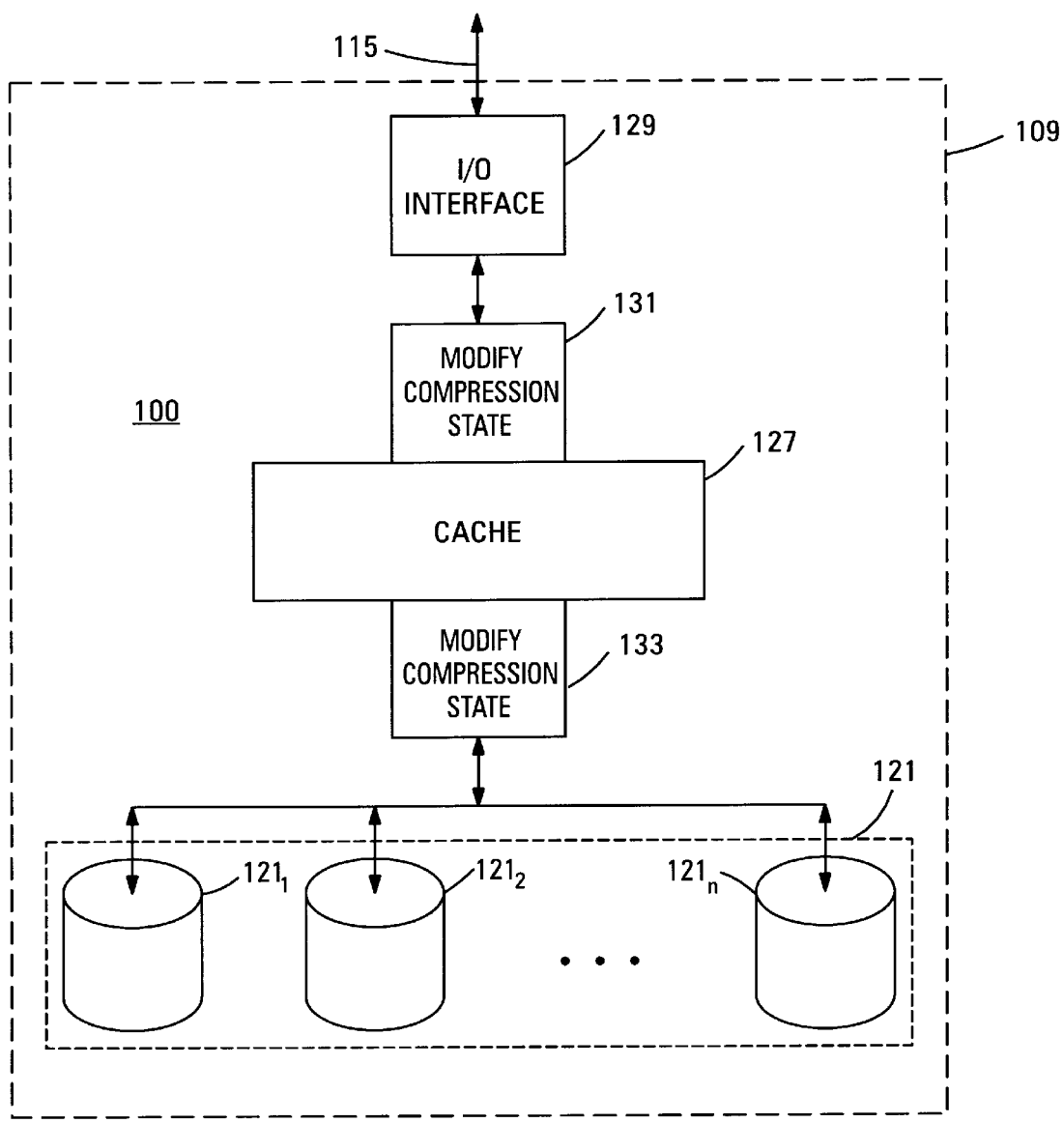
FIG. 3 is a block diagram of a multilevel data storage system according to the invention.

An example of a multilevel storage system 100 according to the invention is shown in FIG. 3. In the multilevel storage system according to the invention, data compression is selectively applied only to the storage device or devices in which its use is beneficial, and is not applied to the storage device or devices in which its use does not provide a significant benefit. This way of applying data compression provides the multilevel storage system according to the invention with improved performance and lower cost than a conventional multilevel storage system without data compression, and with simpler space management than a conventional multilevel storage system with data compression.

A multilevel disk store 109 based on read/write disk drives will be described as an example of the multilevel storage system according to the invention. The multilevel disk store 109 has storage devices at two levels, the upper-level storage device 127 and the lower-level storage device 121. The cache memory constitutes the upper-level storage device and the read/write disk drives $121_1, 121_2, \ldots 121_n$ constitute the lower-level storage device. However, the number of levels of storage devices and the type of storage device used in each level are not critical to the invention. The multilevel storage system may have storage devices at a greater number of levels, and may be based on other types of storage device, such as tape drives, or flash memory. Moreover, a single disk drive may be used instead of multiple disk drives as the lower-level storage device.

Figure 1:
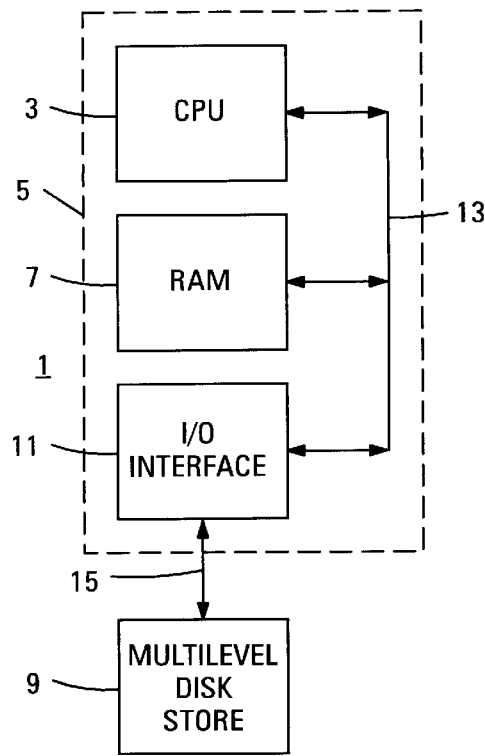
FIG. 1 is a block diagram of an information storage system including a conventional hierarchical multilevel storage system.

The multilevel disk store 109 additionally includes the I/O interface 129 through which data are transferred to and from the multilevel disk store. The I/O interface is connected to a computer or some other device by the data link 115. The computer may be similar to the computer 5 shown in FIG. 1.

In the multilevel disk store 109, a large amount of data is stored in the lower-level storage device 121, For example, the disk drives $121_1, 121_2 \ldots 121_n$ constituting the lower-level storage device may store sets of image data, each of which represents an image forming part of a large library of images. In response to a command from the computer or other device (not shown), the multilevel disk store delivers a set of image data representing an image selected from the library to the I/O interface 129. The set of image data is then transferred to the computer via the link 115.

The upper-level storage device 127 stores a substantially smaller amount of data than the lower-level storage device 121. At least some of the data stored in the upper-level storage device may constitute a subset of the data stored in the lower-level storage device. The data stored in the upper-level storage device may include sets of data that are demanded by the computer more frequently than others of the sets of data stored in the lower-level storage device. The upper-level storage device may also buffer newly-received data prior to such data being stored in the lower level storage device. Buffering allows data to be transferred to the multilevel disk store 109 at a data transfer rate faster than that of the lower-level storage device.

In a practical example of the multilevel disk store 109, the disk drives $121_1, 121_2 \ldots 121_n$ collectively store in the order of one terabyte of data, and the random access memory-based cache memory stores about 4 gigabytes of data.

In view of the factors described above, data compression is only applied to the upper-level storage device 127 in the multilevel storage system 100 according to the invention. To effect this data compression, the multilevel storage system additionally includes the compression state modifying engine 131 interposed between the I/O interface 129 and the cache memory, and the compression state modifying engine 133 interposed between the cache memory and the lower-level storage device 121.

The compression state modifying engines 131 and 133 may be hardware devices, or their function may be provided by executing a compression state modifying program on a suitable computer. For example, such compression state modifying program may be run on a microprocessor (not shown) built into the multilevel disk store 109. The compression state modifying engine 131 operates to compress data received by the I/O interface 129 and to feed the resulting compressed data for storage in the cache memory 127, and operates to expand data read from the cache memory and to feed the resulting uncompressed data to the I/O interface. The compression state modifying engine 133 operates to compress data read from the disk drives $121_1$, $121_2 \ldots 121_n$ and to feed the resulting compressed data for storage in the cache memory 127, and operates to expand data read from the cache memory and to feed the resulting uncompressed data for storage in the disk drives. Hardware devices and compression state modifying programs suitable for use as the compression state modifying engines 131 and 133 are known in the art and so will not be described here. Compressing data increases the compression state of the data. Expanding compressed data decreases the compression state of the compressed data.

The compression state modifying engines 131 and 133 preceding and following the upper-level storage device 127 compress all the data that are stored in the upper-level storage device, and expand the compressed data read from the upper-level storage device to the uncompressed state. Consequently, all the data transferred into and out of the multilevel disk store 109 are in an uncompressed state, and all the data transferred into and out of the lower-level storage device 121 are in an uncompressed state. Only the data stored in the upper level storage device are in a compressed state.

The compression state modifying engines 131 and 133 increase the effective size of the cache memory constituting the upper-level storage device 127 by a factor equal to the average compression ratio they apply as they compress the data. The increase in the effective size of the cache memory can be exploited by storing a greater amount of data in a cache memory of a given size. This increases the hit rate of the cache memory. Alternatively, the size and cost of the physical memory required to cache a given amount of data may be reduced. This enables a given hit rate to be maintained at a lower cost. Finally, by reducing the size of the physical memory constituting the cache memory by less than the compression ratio, an increased hit rate and a lower cost can both be obtained.

Interposing the upper-level storage device 127 between the compression state modifying engines 131 and 133 does not increase the complexity of the memory management of the cache memory that constitutes the upper-level storage device. Conventional memory management systems for RAM-based memories do not expect to receive fixed-size data blocks, and can therefore manage a cache memory in which the size of the data blocks depends on the compression ratio applied to the data by the compression state modifying engines 131 and 133.

Although the invention has been described with reference to a multilevel disk store 109 in which the data transferred at the I/O interface 129 are in an uncompressed state and the data stored in the lower-level storage device 121 are in an uncompressed state, this is not critical to the invention. The data transferred at the I/O interface may be in a first compression state, and the data stored in the lower-level storage device may be in a third compression state. The first and third compression states may encompass compression states ranging from the uncompressed state up to any compression state less than the compression state in which the data are stored in the high-level storage device 127. The first and third compression states may be the same or may differ. In other words, when the multilevel storage system according to the invention operates with compressed data, the compression state modifying engines 131 and 133 apply additional data compression to data received at the I/O interface 129 and to data read from the lower-level storage device 121, respectively, so that the data stored in the upper-level storage device 127 are in a higher state of compression than the data elsewhere in the system.

For example, the image data referred to above may be transferred at the I/O interface 129 and may be stored in the low-level storage device 121 in a standardized compression format, such as the JPEG format, or the MPEG format if the images are moving images. As another example, the data stored in the lower-level storage device may be compressed in a manner that results in fixed-length blocks to avoid the space management problems referred to above.

The compression state modifying engine 131 may operate to increase the compression state of data received at the I/O interface 129 in the first compression state to a second, higher, compression state in which such data are stored in the upper-level storage device 127. The compression state modifying engine 131 may additionally or alternatively operate to decrease the compression state of data read from the upper-level storage device in the second compression state, and to deliver data in the first compression state to the I/O interface. The compression state modifying engine 133 may operate to increase the compression state of data read from the lower-level storage device 121 in the third compression state to the second compression state in which such data are stored in the upper-level storage device. The compression state modifying engine 133 may additionally or alternatively operate to decrease the compression state of data read from the upper-level storage device in the second compression state, and to deliver data in the third compression state for storage in the lower-level storage device. Moreover, the compression state modifying engines 131 and 133 may receive data from the I/O interface 129 and the lower-level storage device 121 in different compression states from those in which they deliver data to the I/O interface and the lower-level storage device, respectively.

The compression state modifying engine 133 interposed between the upper-level storage device 127 and the lower-level storage device 121 may expand the compressed data read from the cache memory so that the data stored in the lower-level storage device are in the uncompressed state. This enables all or part of the low-level storage device to be transferred with its contents intact from the multilevel storage system shown in FIG. 3, in which a data compression is applied only to the upper-level storage device, to a multilevel storage system in which data compression is not used.

The compression state modifying engine 133 interposed between the upper-level storage device 127 and the lower-level storage device 121 may expand the compressed data read from the cache memory so that the data stored in the disk drives are in a standardized compression state, such as JPEG. This enables all or part of the low-level storage device to be transferred with its contents intact from the multilevel storage system shown in FIG. 3, in which additional data compression is applied to the upper-level storage device, to a multilevel storage system in which the same standardized data compression scheme is applied to more than one storage level.

The compression state modifying engines 131 and 133 can employ data-specific or cache-specific compression algorithms because the compressed data are ephemeral and are not subject to long-term storage in the multilevel storage system in their compressed state. Moreover, the compression state modifying engines can employ dynamic and non-standard compression algorithms because the compressed data stored in the upper-level storage device 127 do not need to be compressed using a standard algorithm to enable them to be expanded outside the multilevel storage system.

The compression state modifying engines 131 and 133 can be dynamically enabled and disabled at will. This can be done to permit fault containment or recovery, for example.

Although the invention has been described with reference to an example in which the multilevel storage system 100 is based on read/write disks, this is not critical to the invention. The multilevel storage system may be based on read-only disks. For example, the multilevel storage system may be a CD-ROM jukebox or a DVD-ROM jukebox. In this case, the compression state modifying engine 133 would operate only to compress data, and the compression state modifying engine 131 would operate only to expand compressed data. Since additional data compression is applied to only the data stored in the upper-level storage device 127, the lower level storage device 121 can read standard, uncompressed CD-ROMs or DVD-ROMs, or CD-ROMs or DVD-ROMs in which data are compressed in a standardized compression format.

Moreover, the multilevel storage system may be based on a write-only lower-level storage device. For example, the multilevel storage system may be used to store data selected from an information storage system for reproduction elsewhere. The selected data would be stored on writeable CD-ROMs. In this case, the compression state modifying engine 131 would operate only to compress data, and the compression state modifying engine 133 would operate only to expand compressed data. Since additional data compression is applied only to the data stored in the cache memory 127, the data stored in the writeable CD-ROMs are in a standard compressed or uncompressed format.

Although a specific embodiment of the invention has been described and illustrated in this disclosure, the invention is not to be limited to the specific form or arrangement of parts so described or illustrated. The invention is defined solely by the following claims.

I claim:
1. A multilevel data storage system comprising:
   an interface through which data are transferred in a first compression state;
   an upper-level storage device in which data are stored in a second compression state, the second compression state being higher than the first compression state;
   a lower-level storage device in which data are stored in a third compression state, the third compression state being lower than the second compression state;
   a first compression state modifying engine between the interface and the upper-level storage device; and
   a second compression state modifying engine between the upper-level storage device and the lower-level storage device.

2. The multilevel data storage system of claim 1, in which the upper-level storage device has a substantially higher per-byte cost than the lower-level storage device.

3. The multilevel data storage system of claim 2, in which the first compression state modifying engine includes means for applying data-specific compression to data received from the interface for storage in the upper-level storage device.

4. The multilevel data storage system of claim 3, in which the second compression state modifying engine includes means for applying data-specific compression to data received from the lower-level storage device for storage in the upper-level storage device.

5. The multilevel data storage system of claim 2, in which the second compression state modifying engine includes means for applying data-specific compression to data received from the lower-level storage device for storage in the upper-level storage device.

6. The multilevel data storage system of claim 1, in which the first compression state modifying engine includes means for applying data-specific compression to data received from the interface for storage in the upper-level storage device.

7. The multilevel data storage system of claim 6, in which the second compression state modifying engine includes means for applying data-specific compression to data received from the lower-level storage device for storage in the upper-level storage device.

8. The multilevel data storage system of claim 1, in which the second compression state modifying engine includes means for applying data-specific compression to data received from the lower-level storage device for storage in the upper-level storage device.

9. The multilevel data storage system of claim 1, in which the lower-level storage device includes a disk drive and the upper-level storage device includes semiconductor random-access memory.

10. The multilevel data storage system of claim 9, in which:
    the disk drive includes a read/write element in which the data in the third compression state are stored;
    the first compression state modifying engine operates to increase the compression state of data transferred from the interface to the upper-level storage device, and operates to decrease the compression state of data transferred from the upper-level storage device to the interface; and
    the second compression state modifying engine operates to decrease the compression state of data transferred from the upper-level storage device to the lower-level storage device, and operates to increase the compression state of data transferred from the lower-level storage device to the upper-level storage device.

11. The multilevel data storage system of claim 1, in which:

the lower-level storage device includes a read-only element in which the data in the third compression state are stored;

the first compression state modifying engine operates to decrease the compression state of data transferred from the upper-level storage device to the interface; and the second compression state modifying engine operates to increase the compression state of data transferred from the lower-level storage device to the upper-level storage device.

12. The multilevel data storage system of claim 1, in which:

the lower-level storage device includes a write-only element in which the data in the third compression state are stored;

the first compression state modifying engine operates to increase a compression state of data transferred from the interface to the upper-level storage device; and the second compression state modifying engine operates to decrease the compression state of data transferred from the upper-level storage device to the lower-level storage device.

13. The multilevel data storage system of claim 1, in which the first compression state is an uncompressed state.

14. The multilevel data storage system of claim 13, in which the third compression state is an uncompressed state.

15. The multilevel data storage system of claim 1, in which the third compression state is an uncompressed state.

16. The multilevel data storage system of claim 1, in which the first and third compression states are the same.

17. The multilevel data storage system of claim 1, in which the lower-level storage device includes removable storage elements capable of transfer to a storage system in which compression state modification is not used.

18. The multilevel data storage system of claim 1, in which the lower-level storage device includes removable storage elements capable of transfer to a storage system in which compression state modification according to a standardized scheme is used.

* * * * *